United States Patent
Parsley et al.

(10) Patent No.: US 9,016,631 B2
(45) Date of Patent: Apr. 28, 2015

(54) MULTI-PURPOSE HATCH SYSTEM

(71) Applicants: John Parsley, Fort Walton Beach, FL (US); David Felker, Fort Walton Beach, FL (US)

(72) Inventors: John Parsley, Fort Walton Beach, FL (US); David Felker, Fort Walton Beach, FL (US)

(73) Assignee: R4 Integration, Inc., Fort Walton Beach, FL (US)

( * ) Notice: Subject to any disclaimer, the term of this patent is extended or adjusted under 35 U.S.C. 154(b) by 74 days.

(21) Appl. No.: 13/736,299

(22) Filed: Jan. 8, 2013

(65) Prior Publication Data

US 2013/0263514 A1  Oct. 10, 2013

Related U.S. Application Data

(60) Provisional application No. 61/621,886, filed on Apr. 9, 2012.

(51) Int. Cl.
*E06B 5/00* (2006.01)
*B64C 1/14* (2006.01)

(52) U.S. Cl.
CPC ............. *E06B 5/00* (2013.01); *B64C 1/1446* (2013.01)

(58) Field of Classification Search
CPC ............ E05B 5/00; B64C 1/1446; B64C 1/14
USPC ......... 244/129.4, 129.1, 129.5; 220/378, 324; 343/705
See application file for complete search history.

(56) References Cited

U.S. PATENT DOCUMENTS

| | | | |
|---|---|---|---|
| 2,207,084 A * | 7/1940 | Bowers | 312/22 |
| 4,188,631 A * | 2/1980 | Dougherty et al. | 343/705 |
| 4,811,026 A * | 3/1989 | Bissett | 343/766 |
| 5,105,718 A * | 4/1992 | Sprafke et al. | 89/36.08 |
| 5,257,758 A * | 11/1993 | Hassel | 244/137.4 |
| 5,528,250 A * | 6/1996 | Sherwood et al. | 343/711 |
| 5,918,834 A * | 7/1999 | Sommer et al. | 244/129.1 |
| 5,931,415 A * | 8/1999 | Lingard et al. | 244/129.5 |
| 6,486,845 B2 * | 11/2002 | Ogawa et al. | 343/765 |
| 6,710,749 B2 * | 3/2004 | King | 343/757 |
| 6,831,610 B2 * | 12/2004 | Quagliaro | 343/705 |
| 6,987,489 B2 * | 1/2006 | Melconian et al. | 343/779 |
| 6,999,036 B2 * | 2/2006 | Stoyanov et al. | 343/765 |
| 7,255,376 B2 * | 8/2007 | Pratt et al. | 292/201 |
| 7,492,322 B2 * | 2/2009 | Jung et al. | 343/757 |
| 7,911,400 B2 * | 3/2011 | Kaplan et al. | 343/713 |
| 8,016,235 B2 * | 9/2011 | Ramirez Blanco et al. | 244/119 |
| 8,100,363 B2 * | 1/2012 | Ponsart et al. | 244/129.4 |
| 8,141,820 B2 * | 3/2012 | Z niga Sagredo | 244/129.4 |
| 8,248,315 B2 * | 8/2012 | Lindackers et al. | 343/713 |
| 8,253,644 B2 * | 8/2012 | Hnatiw | 343/841 |
| 8,376,277 B2 * | 2/2013 | Costanza et al. | 244/121 |

(Continued)

*Primary Examiner* — Katherine Mitchell
*Assistant Examiner* — Justin Rephann
(74) *Attorney, Agent, or Firm* — The Law Firm of Andrea Hence Evans, LLC

(57) ABSTRACT

A multi-purpose hatch system having a removable antenna mounting plug, block or plate for installing multiple configurations of antennas or sensors is disclosed. The system features a hatch having an opening sized to receive the antenna mounting plug, block or plate. The hatch features handles which aid in installation and removal of the hatch. Multiple configurations of antennas or sensors attached to the plate can easily be removed and quickly installed to configure an aircraft for a specific mission. The system also features a billet machined hatch body, field replaceable seals and easily adaptable antenna or sensor mounting configurations which provide unprecedented ruggedness, antenna options, and field supportability.

12 Claims, 14 Drawing Sheets

(56) References Cited

U.S. PATENT DOCUMENTS

| | | | |
|---|---|---|---|
| 8,443,575 B1* | 5/2013 | Tanner et al. | 52/784.1 |
| 8,453,968 B2* | 6/2013 | Dias Ferraz | 244/118.1 |
| 8,662,451 B2* | 3/2014 | Delgado Jareno et al. | 244/129.4 |
| 8,684,216 B2* | 4/2014 | Tachibana | 220/327 |
| 2003/0090416 A1* | 5/2003 | Howell et al. | 342/359 |
| 2003/0214449 A1* | 11/2003 | King | 343/757 |
| 2004/0017322 A1 | 1/2004 | Bostwick et al. | |
| 2005/0116106 A1* | 6/2005 | Perez-Sanchez | 244/129.4 |
| 2005/0200526 A1* | 9/2005 | Crain et al. | 343/700 MS |
| 2006/0284775 A1* | 12/2006 | Kaplan et al. | 343/713 |
| 2007/0187551 A1* | 8/2007 | Myers et al. | 244/129.4 |
| 2008/0018545 A1* | 1/2008 | Kaplan et al. | 343/713 |
| 2008/0105111 A1* | 5/2008 | Costanza et al. | 89/1.11 |
| 2009/0014590 A1* | 1/2009 | Ponsart et al. | 244/129.4 |
| 2009/0145905 A1* | 6/2009 | Kim | 220/345.1 |
| 2009/0166473 A1* | 7/2009 | Zuniga Sagredo | 244/129.4 |
| 2009/0173824 A1* | 7/2009 | Perez-Sanchez | 244/129.4 |
| 2009/0294591 A1* | 12/2009 | Ramirez Blanco et al. | 244/129.4 |
| 2010/0060513 A1 | 3/2010 | Henderson | |
| 2010/0140406 A1* | 6/2010 | Walton et al. | 244/129.5 |
| 2010/0164817 A1* | 7/2010 | Kaplan et al. | 343/713 |
| 2010/0187358 A1* | 7/2010 | Voss et al. | 244/129.4 |
| 2010/0206988 A1 | 8/2010 | Woodland | |
| 2011/0215985 A1* | 9/2011 | Kaplan et al. | 343/879 |
| 2012/0097794 A1* | 4/2012 | Fort et al. | 244/129.4 |
| 2013/0212945 A1* | 8/2013 | Lanham et al. | 49/25 |

* cited by examiner

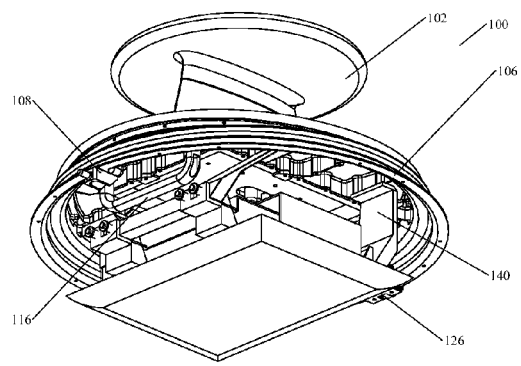
FIG. 12A
FIG. 12C
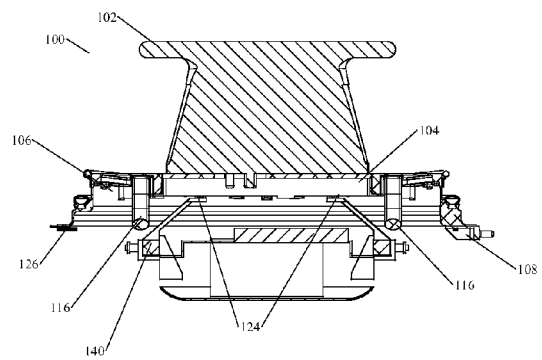
FIG. 12B
FIG. 12D

MULTI-PURPOSE HATCH SYSTEM

CROSS-REFERENCE TO RELATED APPLICATIONS

This application claims the benefit of, and is related to, the following Applicant's provisional patent application: U.S. Provisional Patent Application No. 61/621,886 titled "MULTI PURPOSE HATCH SYSTEM," filed Apr. 9, 2012.

FIELD OF THE INVENTION

The present invention relates in general to a multi-purpose hatch system, and more specifically to a multi-purpose hatch system with threaded mounting points for system specific components and with a removable or replaceable antenna mounting block or plate for installing multiple configurations of antennas.

BACKGROUND OF THE INVENTION

Capable of using unprepared runways for takeoffs and landings, the C-130 aircraft was originally designed as a troop, medical evacuation, and cargo transport aircraft. The aircraft's versatile airframe has found uses in a variety of other roles, including as a gunship (AC-130), for airborne assault, search and rescue, scientific research support, weather reconnaissance, aerial refueling, maritime patrol and aerial firefighting.

In all its applications, long range and other sensor communication systems have been required on the aircraft. Such communication is made possible by way of antennas on the aircraft. Antennas on aircraft are critical and used for transmitting and receiving communication signals at arbitrary frequencies over a set frequency range. There are a number of different types of communication systems and antennas available to suit an aircraft's role and mission requirements.

SUMMARY OF THE INVENTION

This invention introduces a multi-purpose hatch system for installing multiple configurations of antennas which can be easily removed and quickly installed to configure an aircraft for a specific mission or role without alteration or modification of the aircraft basic mechanical structure. Removing the multi-purpose hatch system returns the aircraft to its original configuration without the cost and delays of permanently installing mission specific communications/sensor equipment.

An aspect of an embodiment of the invention features a multi-purpose hatch system, which may include a hatch body and one or more openings within the hatch body. In one aspect of an embodiment of the present invention, the one or more openings may or may not be centrally located within the hatch body. The multi-purpose hatch system may also feature a pair of handles connected to the bottom of the hatch body and on either side of the one or more openings, one or more replaceable antenna mounting plugs, blocks or plates, which, in one aspect of an embodiment of the present invention, may be adapted to fit and be affixed within the hatch body opening(s). The one or more replaceable antenna mounting plugs, blocks or plates may be easily replaced for reconfiguration for different types of antennas, sensors or other mounted components.

The multi-purpose hatch system may also feature a concentric arrangement of a pressure seal, seal retaining ring and a weather seal. These seals provide unprecedented ruggedness, antenna options, and field supportability. In one aspect of an embodiment of the present invention, the concentric arrangement may be circumferentially arranged around the periphery of the hatch body. In another aspect, the weather seal may be fixedly mounted using a securing ring and screws.

In an aspect of an embodiment of the present invention, the pressure seal may ring or may be positioned along the circumference of the hatch body.

In an aspect of an embodiment of the present invention, the seal retaining ring may be circumferentially positioned along the periphery of the pressure seal.

In an aspect of an embodiment of the present invention, the weather seal may be circumferentially positioned along the periphery of the seal retaining ring.

In an aspect of an embodiment of the present invention, the one or more replaceable antenna mounting block or plates may be configured to be mounted in a flush position with the top surface of the hatch body or may protrude above or below the hatch body.

In another aspect of an embodiment of the present invention, the one or more replaceable antenna mounting plugs, blocks or plates may be adapted to have one or more antenna mounted thereon.

In another aspect of an embodiment of the present invention, the multi-purpose hatch system may additionally feature an antenna bracket. In one aspect, the antenna bracket may have mounting legs with which it may be mounted on the one or more replaceable antenna mounting plugs, blocks or plates. In another aspect, the antenna bracket may be adapted to have one or more antennae mounted thereon.

In another aspect of an embodiment of the present invention, the hatch body system may feature a retractable latching pin assembly positioned at a location along the periphery of the hatch body.

In another aspect of an embodiment of the present invention, the hatch body system may feature a latch mechanism coupler positioned at a location along the periphery of the hatch body.

In another aspect of an embodiment of the present invention, the hatch body system may feature a number of screw threads around its periphery for the purpose of attaching radomes, fairings or other associated components.

In another aspect of an embodiment of the present invention, the hatch body system may feature the ability to recess electronic components for antennas used by the aircraft.

In another aspect of an embodiment of the present invention, the hatch body may be configured to be installed onto an aircraft escape hatch.

In another aspect of an embodiment of the present invention, the hatch body system may feature a box structure mounted below the one or more replaceable antenna mounting plugs, blocks or plates. This box structure, in one aspect, may be pressure tight or vented as necessary to contain components critical to the communications or sensor system.

In another aspect of an embodiment of the present invention, the hatch body system may feature a number of threaded weather seal mounting points.

In yet another aspect of an embodiment of the present invention, the hatch body system may feature a number of threaded mounting bosses.

In yet another aspect of an embodiment of the present invention, the hatch body system may feature a number of threaded mounting points at the bottom of the hatch body system for mounting or attaching communication or sensor system components.

In yet another aspect of an embodiment of the present invention, the hatch body system may feature an equipment mounting structure fixedly hanging from the bottom of the hatch body system.

In yet another aspect of an embodiment of the present invention, the hatch body system may feature a standoff adapter plate which may be coupled to the communications or sensor mounting plug, block or plate. In one aspect, this standoff plate may be used to extend the footprint area of antennas or sensors whose footprints extend beyond those of the one or more antenna mounting plugs, blocks or plates.

BRIEF DESCRIPTION OF THE DRAWINGS

The features and advantages of aspects of the present invention will become more apparent from the detailed description set forth below when taken in conjunction with the claims and drawings, in which like reference numbers indicate identical or functionally similar elements.

FIG. 12A illustrates a bottom perspective view of a multi-purpose hatch system showing equipment mounted onto the system according to an aspect of an embodiment of the present invention.

FIG. 12B illustrates a side view of a multi-purpose hatch system showing equipment mounted onto the system according to an aspect of an embodiment of the present invention.

FIG. 12C illustrates a side view of a multi-purpose hatch system showing equipment mounted onto the system according to an aspect of an embodiment of the present invention.

FIG. 12D illustrates a perspective view showing equipment component mounting structure of the multi-purpose hatch system according to an aspect of an embodiment of the present invention.

DETAILED DESCRIPTION OF THE INVENTION

Figure 1:
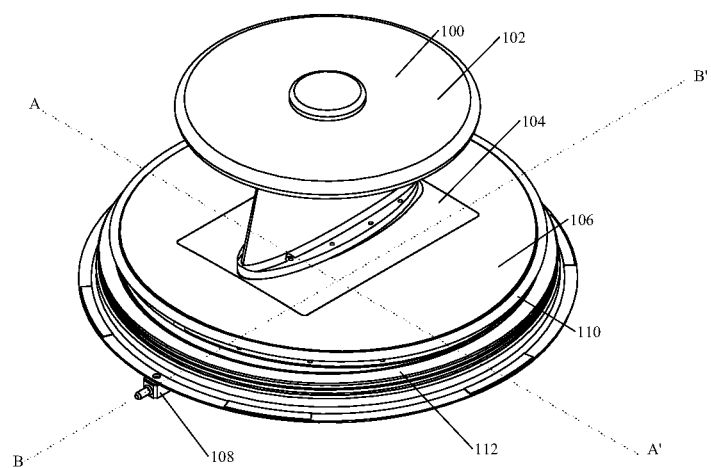
FIG. 1 illustrates a perspective view of a multi-purpose hatch system according to an aspect of an embodiment of the present invention.

The multi-purpose hatch system allows mounting and removal of various communications and sensor components on the hatch body. The hatch body, one or more replaceable antenna mounting plugs, blocks or plates, and field replaceable seals all as contemplated by an aspect of an embodiment of the present invention, provide unprecedented ruggedness, multiple antenna or sensor mounting options, and good field supportability. The body's construction, which, in one aspect may be made out of solid aluminum, provides additional advantages over previous hatch configurations such as having a much more rugged body, while also having a quicker manufacturing time. The multi-purpose hatch system, according to an aspect of an embodiment of the present invention, is also advantageous as it enables the ability to make the antenna mounting block or plate(s) much larger, design threaded accessory mounting points, design threaded Radome mounting points, design threaded weather seal mounting points and recess electronics components within for certain antennas—which helps in reducing the effective height of the antenna/radome assembly. Radomes protect the antenna surfaces from weather, aerodynamic forces or conceal antenna electronic equipment. The resulting design of the multi-purpose hatch system according to an aspect of an embodiment of the present invention can safely support aircraft pressurization loads of up to 16.2 PSI and can be safely installed and flown at gross weights of up to 100 pounds. The multi-purpose hatch system according to an aspect of an embodiment of the present invention easily installs in either the front or center hatch positions of an aircraft.

The weather seal, according to one aspect, may be held in place with a securing ring and screws. It is also easily field replaceable. The one or more antenna mounting plugs, blocks or plates may be installed from the bottom of the hatch and easily replaced for reconfiguration to a different type of antenna or sensor. The mounting plate(s), in one aspect of an embodiment of the present invention, can be configured as a "box" to facilitate recessing the electronics package of antennas or sensors. This lowers the center of gravity of the hatch system, reduces radome size and aerodynamic drag.

The fact that the multi-purpose hatch system, according to one aspect of an embodiment of the present invention, may be manufactured from solid aluminum billet provides yet another advantage over other systems as billet machining is cheaper and quicker to make than manufacturing other manufacturing processes than billet machining.

The multi-purpose hatch system according to one aspect of an embodiment of the present invention, is additionally advantageous as it enables the use of threaded mounting bosses for installing and removing radomes needed by dish antennas (e.g. Inmarsat, KU, KA, and X-Band systems), enables the use of the same weather and pressure seals as an original hatch and enables the use of threaded mounting points on bottom of the hatch to facilitate the mounting of receivers, transmitters, amplifiers, diplexers, and other equipment.

The multi-purpose hatch system according to one aspect of an embodiment of the present invention further provides the advantage of being able to support heavier antennas, sensors, associated electronics and Radomes.

Additional aspects, objectives, features and advantages of the present invention will become apparent from the following description of the preferred embodiments with reference to the attached drawings.

Referring now to FIG. 1, a perspective view of a multi-purpose hatch system 100 according to an aspect of an embodiment of the present invention is shown. The hatch system 100 is shown having a hatch body 106 and an antenna 102 mounted onto antenna mounting block or plate 104. The antenna mounting block or plate 104, not limitingly, may be mounted and flush with the top surface of the hatch body 106. Alternatively, the mounting block or plate or may protrude above or below the hatch body.

Figure 2:
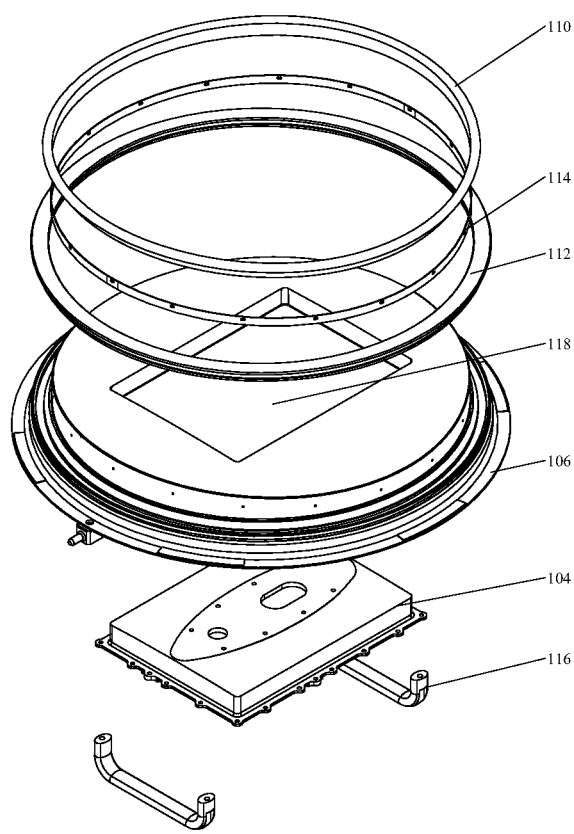
FIG. 2 illustrates an exploded perspective view of a multi-purpose hatch system according to an aspect of an embodiment of the present invention.

In one aspect, replaceable antenna mounting plug, block or plate 104 may be mounted on the underside or bottom of hatch body 106 and within a opening 118 within hatch body 106 (see FIG. 2). The opening 118 is an opening sized to receive the antenna mounting plug, block or plate. The sides of the opening are typically identical in shape to the mounting block or plate. In one aspect of an embodiment of the present invention, there may be one or more antenna mounting blocks to accommodate multiple antennas and/or sensors. In another aspect of an embodiment of the present invention, there may be one or more openings in order to accommodate additional antenna mounting blocks. These openings may or may not be centrally located within the hatch body 106.

Antenna mounting block 104 may be adapted to be affixed within opening 118. Antenna mounting block 104 may be configured as a box to facilitate recessing electronic components below the hatch body 106. This lowers the center of gravity and reduces radome size and height and reduces aerodynamic forces. In another aspect of an embodiment of the present invention, antenna mounting block or plate 104 may be adapted to have one or more antenna or sensor mounted thereon. Antenna mounting block 104 may also be easily replaced from the bottom of the hatch for reconfiguration to a different type of antenna or sensor system.

Figure 3:
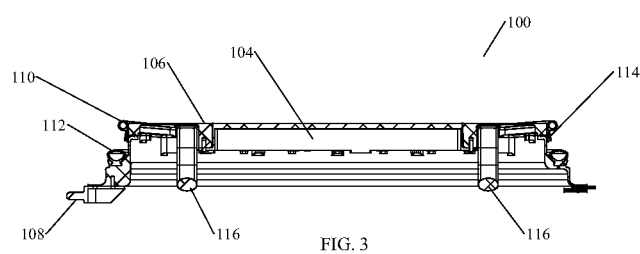
FIG. 3 illustrates a perspective view of the multi-purpose hatch system shown from the A-A' axis of FIG. 1 according to an aspect of an embodiment of the present invention.

Hatch body 106 may be ringed around by a weather seal 110 and a pressure seal 112, as shown in FIG. 3. Multi-purpose hatch system may also feature a retractable latching pin assembly 108 which may be positioned at a location along the periphery of the hatch body 106. Multi-purpose hatch system 100, in one aspect, may be installed by inserting the pin of retractable latching pin assembly 108 into an aircraft's hatch pin receptacle. In one aspect of an embodiment of the present invention, hatch body system may feature a standoff adapter plate which may be coupled to the antenna mounting block or plate 104. This standoff plate may be used to extend the footprint area of antennas or sensors whose footprints extend beyond those of antenna mounting plug, block or plate 104.

Referring now to FIG. 2, a more detailed and exploded perspective view of the multi-purpose hatch system 100 according to an aspect of an embodiment of the present invention is shown. Here, multi-purpose hatch system 100 is shown without antenna 102 for illustrative purposes. The hatch system 100 is shown with the hatch body 106, weather seal 110, pressure seal 112, antenna mounting plug, block or plate 104 and opening 118. Antenna mounting plug, block or plate 104 may be mounted and affixed on the underside or bottom of hatch body 106 within opening 118. Additionally, FIG. 2 shows hatch system 100 with removable seal retaining ring 114 which is located between weather seal 110 and pressure seal 112. These seals provide unprecedented ruggedness, antenna options, and field supportability. In one aspect of an embodiment of the present invention, the concentric arrangement may be circumferentially arranged around the periphery of hatch body 106. In another aspect, weather seal 110 may be fixedly mounted using a securing ring and screws. Pressure seal 112 is positioned along the circumference of hatch body 106, mating to a machined groove in the hatch body 106. Seal retaining ring 114 may be circumferentially positioned along the periphery of pressure seal 112. Weather seal 110 may be circumferentially positioned along the periphery of seal retaining ring 114.

Hatch system 100 is also shown with handles 116 attached or mounted to the underside or bottom of hatch body 106. Handles 116 may be used to assist in the installation, removal, stowage and transportation of multi-purpose hatch system 100.

Figure 4:
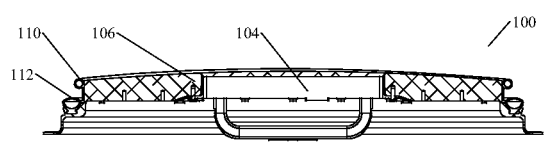
FIG. 4 illustrates a perspective view of the multi-purpose hatch system shown from the B-B' axis of FIG. 1 according to an aspect of an embodiment of the present invention.

Referring now to FIGS. 3 and 4 perspective views of the multi-purpose hatch system 100 are shown from the A-A' and B-B' axes of FIG. 1 according to an aspect of an embodiment of the present invention. The figures show hatch body 106, fixed latching pin assembly 108, weather seal 110, pressure seal 112, and antenna mounting block or plate 104, seal retaining ring 114 and handles 116 in further detail. In one aspect, handles 116 may be connected on either side of the replaceable antenna mounting block or plate 104.

Figure 5:
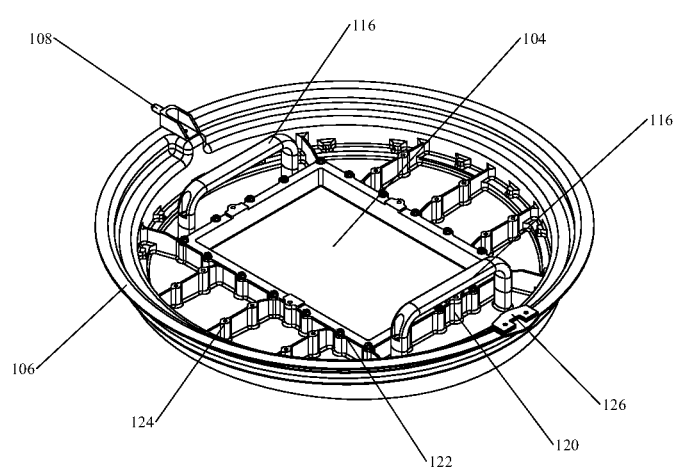
FIG. 5 illustrates a bottom perspective view of a multi-purpose hatch system according to an aspect of an embodiment of the present invention.

Referring now to FIG. 5, a bottom perspective view of a multi-purpose hatch system 100 according to an aspect of an embodiment of the present invention is shown. Here, while also showing hatch body 106, retractable latching pin assembly 108, antenna mounting block or plate 104, handles 116, FIG. 6 also shows plug attaching fasteners 120, antenna mounting block or plate mounting points 122 and equipment threaded mounting points 124 which, in one aspect, are provided to facilitate the mounting of equipment such as diplexers, switches, amplifiers, etc. In one aspect of an embodiment of the present invention, the surface under each plug attaching fastener 120 is prepped for electrical bonding and grounding. Multi-purpose hatch system 100 also features latch mechanism coupler 126 which is used to secure the hatch body with the aircraft's latch mechanism. In one aspect, hatch body system 100 may feature latch mechanism coupler 126 as being positioned at a location along the periphery of hatch body 106.

Figure 10A:
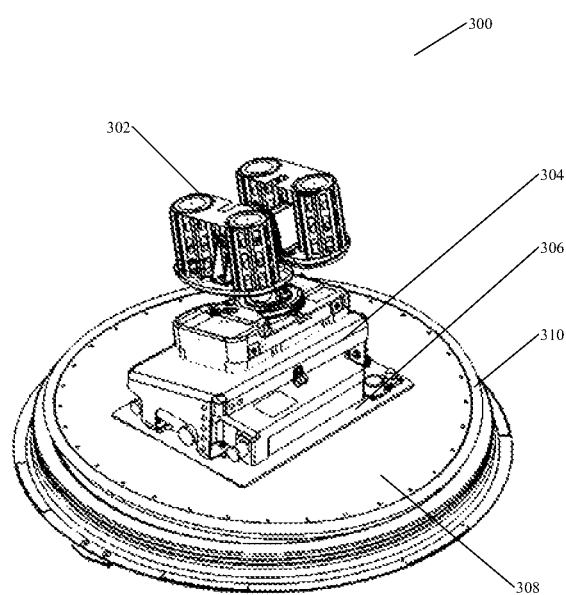
FIG. 10A illustrates a top perspective view of a multi-purpose hatch system along with some antenna components according to another aspect of an embodiment of the present invention.
Figure 10B:
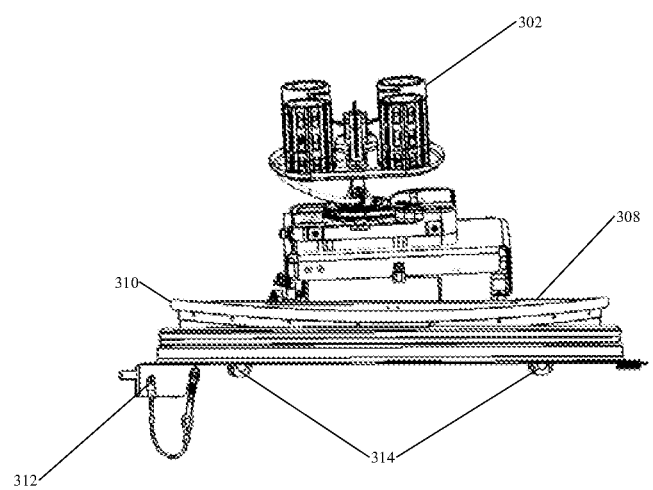
FIG. 10B illustrates a front view of a multi-purpose hatch system along with some antenna components according to another aspect of an embodiment of the present invention.
Figure 10C:
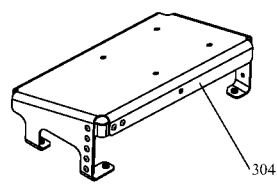
FIG. 10C illustrates a top perspective view of a bracket of the multi-purpose hatch system according to an aspect of an embodiment of the present invention.
Figure 10D:
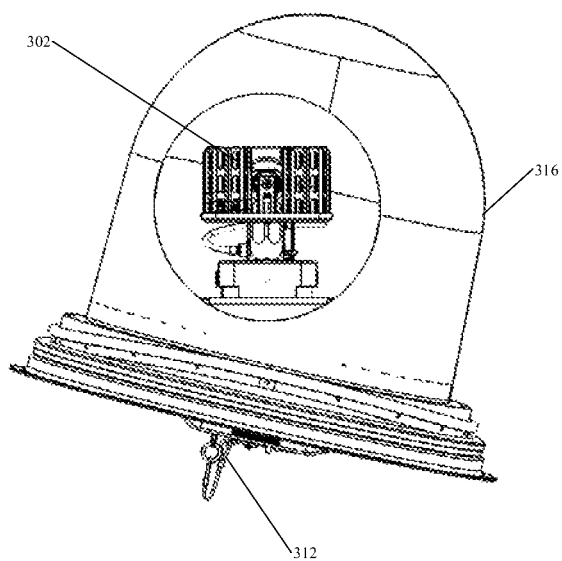
FIG. 10D illustrates a side view of an antenna dome of the multi-purpose hatch system according to an aspect of an embodiment of the present invention.
Figure 10E:
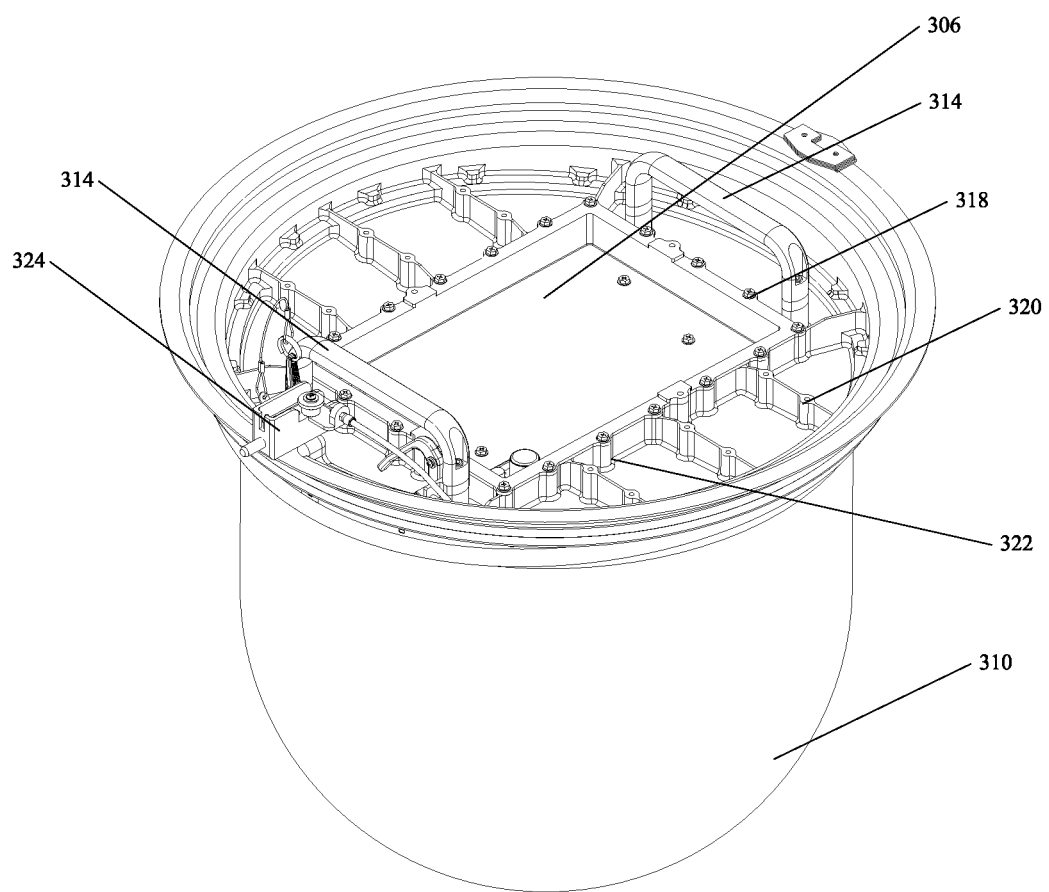
FIG. 10E illustrates a bottom perspective view of a multi-purpose hatch system along with some antenna components according to another aspect of an embodiment of the present invention.

Multi-purpose hatch system 100, in one aspect, is installed by inserting the pin of retractable latching pin assembly 108 into the aircraft's pin receptacle. In another aspect, the latching pin assembly 108 can be replaced with the retractable latching pin assembly 324 as shown in FIG. 10E. The aircraft's latch mechanism is then closed to hold the multi-purpose hatch system in place by way of coupling the aircraft release clamp with clam plate 126.

Figure 6:
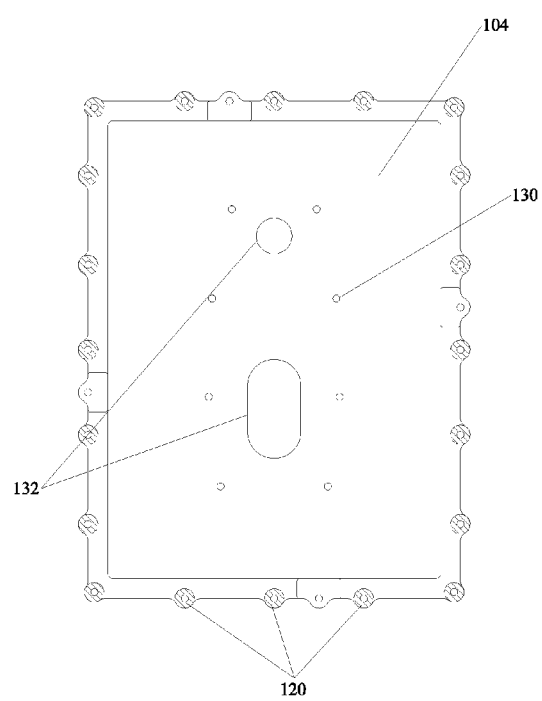
FIG. 6 illustrates a bottom view of an antenna mounting plug, block or plate according to an aspect of an embodiment of the present invention.
Figure 7:
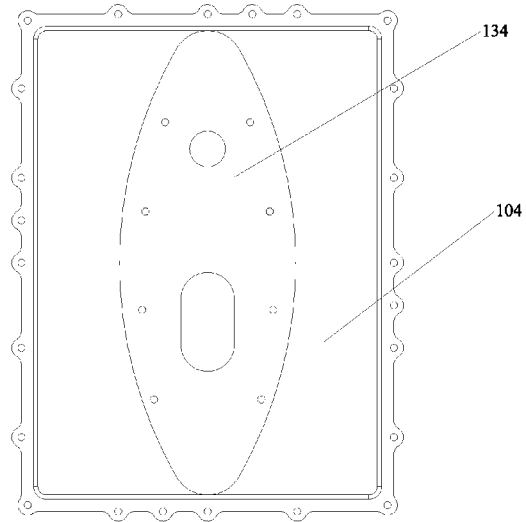
FIG. 7 illustrates a top view of an antenna mounting block or plate according to an aspect of an embodiment of the present invention.

Referring now to FIGS. 6 and 7, top and bottom views of antenna mounting plug, block or plate 104 according to aspects of embodiments of the present invention are shown respectively. Antenna mounting block or plate 104 is shown having numerous plug attaching fasteners 120 and antenna mounting block or plate mounting points 122. Antenna mounting block or plate 104 is also shown having openings 130 and 132 which may be used for securing and mounting the antenna 102 to antenna mounting plug, block or plate 104. Antenna's 102 footprint 134 is seen outlined in FIG. 7. In one aspect of an embodiment of the present invention, antenna mounting block or plate 104 may be adapted to have a stand-off adapter plate added to it in order to extend, enlarge, or alter the footprint area 134 of antenna 102.

Figure 8:
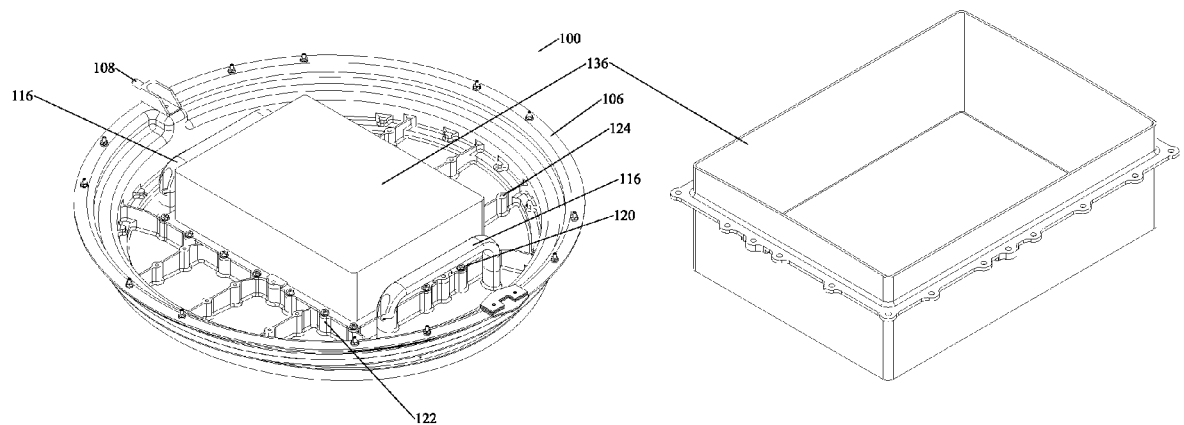
FIG. 8 illustrates a bottom perspective view of a multi-purpose hatch system according to an aspect of an embodiment of the present invention.

Referring now to FIG. 8, a bottom perspective view of a multi-purpose hatch system 100 according to an aspect of an embodiment of the present invention is shown. Here, in addition to previously described elements such as hatch body 106, retractable latching pin assembly 108, handles 116, plug attaching fasteners 120, antenna mounting block or plate mounting points 122, equipment mounting points 124, FIG. 8 shows antenna mounting block or plate 104 having a recess enclosure or box 136 which may be used to accommodate additional electronics gear, wiring, and/or accessories for antenna and/or sensor 102.

Figure 9B:
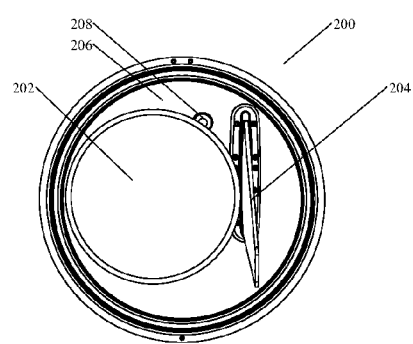
FIG. 9B illustrates a top view of a multi-purpose hatch system according to an aspect of an embodiment of the present invention.
Figure 9C:
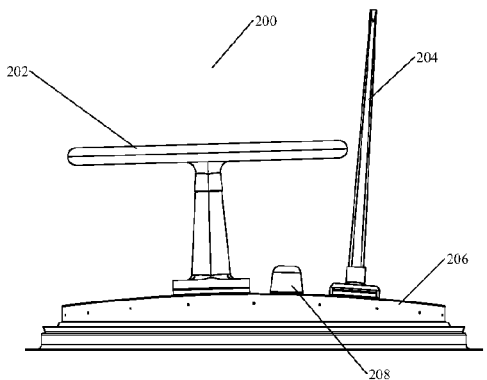
FIG. 9C illustrates a front view of a multi-purpose hatch system according to an aspect of an embodiment of the present invention.
Figure 9A:
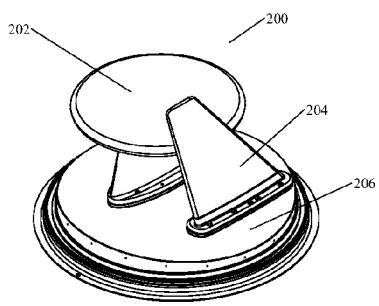
FIG. 9A illustrates a side perspective view of a multi-purpose hatch system according to an aspect of an embodiment of the present invention

Referring now to FIGS. 9A-9C, side, top and front views of a multi-purpose hatch system 200 according to an aspect of an embodiment of the present invention are shown. Here, multi-purpose hatch system 200 is shown with three antennas 202 204, and 208. In one aspect of an embodiment of the present invention, antenna mounting block or plate (not shown) may be configured to accommodate multiple antennas 202, 204, 208.

Referring now to FIGS. 10A-10E, perspective views of a multi-purpose hatch system 300 along with some additional antenna components according to an aspect of an embodiment of the present invention are shown. Multi-purpose hatch system 300 is shown in top perspective and front views in FIGS. 10A & 10B where antenna 302 is shown mounted on antenna bracket 304 (shown in detail in FIG. 10C). Antenna bracket 304 is, in one aspect, used to mount antenna 302 and is itself mounted on antenna mounting plug, block or plate 306 by use of its legs as shown. It should be noted that different antenna brackets are contemplated according to aspects of the present invention. In one aspect, antenna bracket 304 may have mounting legs with which it may be mounted on replaceable antenna mounting block or plates 104. In another aspect, antenna bracket 304 may be adapted to have multiple antennas mounted thereon.

Antenna bracket 304 may be used in some installations to adjust the antenna's orientation relative to the top of the hatch or to provide component mounting options in close proximity to the antenna/sensor. Some antennas require different orientations, including those perpendicular to the horizon, alignment with the aircraft reference plane or elevation above the aircraft centerline. Antenna bracket 304 facilitates these requirements.

Multi-purpose hatch system 300 is also shown with hatch body 308, weather seal 310 (which rings hatch body 308 as shown), retractable latching pin assembly 312 and handles 314 mounted on the underside of hatch body 308. Retractable latching pin assembly 312 is mounted/positioned at a location along the periphery of hatch body 308 and axially across from handles 314. In one aspect of an embodiment of the present invention, antenna 302 may be covered by a dome 316 (FIG. 10D) which may be used to protect antenna 302 from the elements or damage. FIG. 10E shows a bottom perspective view of multi-purpose hatch system 300. Here, multi-purpose hatch system 300 is shown with handles 314 mounted on the underside or bottom of hatch body 308. Antenna mounting plug, block or plate 306 is also shown being mounted onto the underside or bottom of hatch body 306 by way of plug attaching fastener 318, Antenna mounting block or plate mounting points 320 and equipment mounting points 322. Antenna dome 310 is shown being mounted on the topside of hatch body 306 while retractable latching pin assembly 312 is shown positioned along the periphery of hatch body 306's underside or bottom and axially across from handles 314.

Figures 11A, 11B:
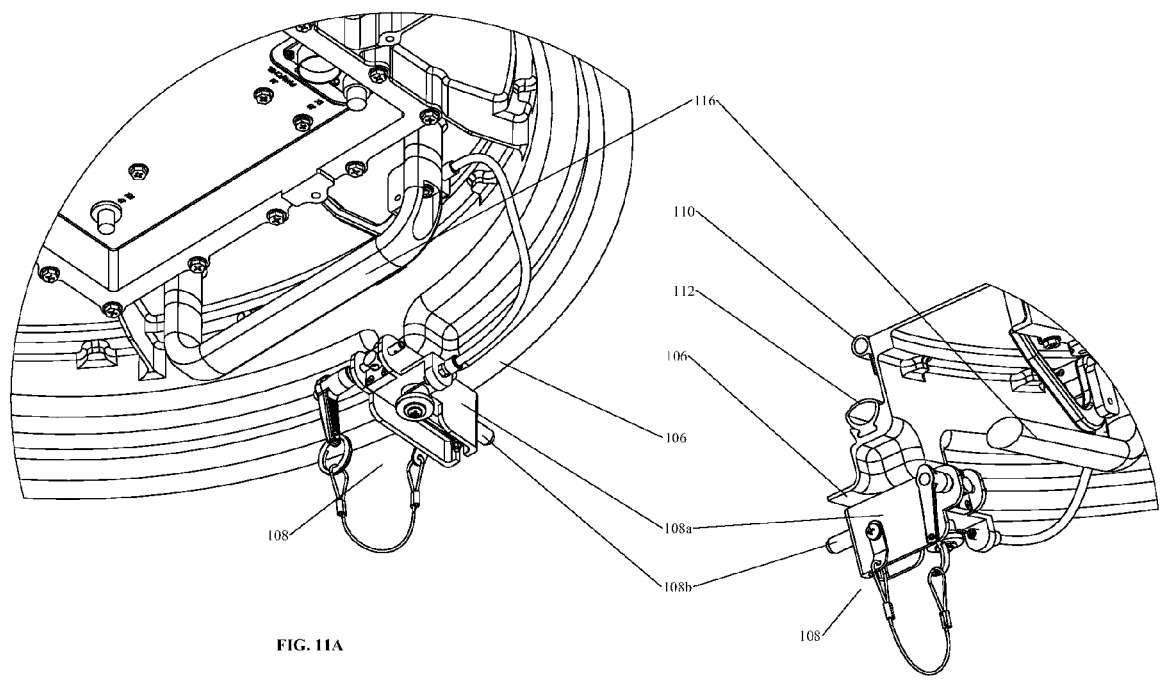
FIG. 11A illustrates a left-side detail perspective view of a retractable latching pin assembly of the multi-purpose hatch system according to an aspect of an embodiment of the present invention.
FIG. 11B illustrates a right-side detail perspective view of a retractable latching pin assembly of the multi-purpose hatch system according to an aspect of an embodiment of the present invention.

Referring now to FIGS. 11A & 11B detailed perspective views of the retractable latching pin assembly 108 of the multi-purpose hatch system 100 according to another aspect of an embodiment of the present invention are shown. FIG. 11A shows retractable latching pin assembly 108 comprising of assembly body 108a and pin 108b. Retractable latching pin assembly 108 is mounted on the periphery of hatch body 106 by way of assembly body 108a. As previously discussed, retractable latching pin assembly 108 is used to install the system in an aircraft by way of inserting pin 108b into the aircraft's pin receptacle.

Referring now to FIGS. 12A-12D perspective views of the multi-purpose hatch system 100 showing equipment mounted onto the system according to an aspect of an embodiment of the present invention are shown. FIG. 12A shows a bottom perspective view of multi-purpose hatch system 100, while FIGS. 12B and 12C show rear and side perspective views of multi-purpose hatch system 100 coupled or connected with equipment underneath. FIG. 12D shows a detail of the equipment hardware structure 138 which may contain the equipment being installed. In another aspect of an embodiment of the present invention, hatch body system 100 may feature a box structure mounted below the antenna mounting block or plate 104. This box structure, in one aspect, may be adapted to hold electronic components for the antennae and associated equipment.

Multi-purpose hatch system 100 is shown with antenna 102, hatch body 106, handles 116, and latch mechanism coupler 126. Additionally, hatch system 100 is shown with equipment structure 138 which may, in one aspect, hold antenna electronics or equipment 142 (such as diplexers, switches, amplifiers, etc.). Equipment structure 138 may be mounted on the underside of hatch body 106 by way of equipment mounts 140 which are connected to hatch body 106 by way of mounting points 124. In one aspect, electronic equipment or components for dish antennas may be recessed within hatch system 100.

The elements plugs, blocks or plates have been used interchangeably.

Although this present invention has been disclosed with reference to specific forms and embodiments, it will be evident that a great number of variations may be made without departing from the spirit and scope of the present invention. For example, steps may be reversed, equivalent elements may be substituted for those specifically disclosed and certain features of the present invention may be used independently of other features—all without departing from the present invention as defined in the appended claims.

What is claimed is:

1. A multi-purpose hatch system of an aircraft having an aircraft opening, comprising:

A hatch body that seals the aircraft opening;

At least one aperture within the hatch body, wherein at least one plate is received in the at least one aperture such that the at least one plate closes the aperture, wherein At least one replaceable antenna is secured to the at least one plate.

2. The system according to claim 1, wherein the at least one plate is configured to be mounted in a flush position with a top surface of the hatch body.

3. The system according to claim 1, further comprising a pair of handles, wherein said handles are connected on either side of the at least one plate.

4. The system according to claim 1, further comprising a box structure mounted below the at least one plate.

5. The system according to claim 1, wherein the hatch body comprises of radome mounting points.

6. The system according to claim 1, wherein the hatch body comprises of weather seal mounting points.

7. The system according to claim 1, further comprising a latch mechanism coupler positioned at a location along the periphery of the hatch body.

8. The system according to claim 1, wherein the hatch body comprises of threaded mounting points.

9. The system according to claim 1, further comprising of an equipment structure fixedly attached to or hanging from the bottom of the hatch body.

10. The system according to claim 1, further comprising a standoff adapter plate coupled to the at least one plate.

11. A multi-purpose hatch system of an aircraft having an aircraft opening, comprising:

A hatch body that seals the aircraft opening;

At least one aperture within the hatch body, at least one replaceable antenna mounting plug, block or plate, wherein the at least one replaceable antenna mounting plug, block or plate fits within the at least one aperture to close the aperture;

at least one antenna bracket mounted on to the at least one replaceable antenna mounting plug, block or plate, wherein an antenna is secured to the at least one antenna bracket, the at least one antenna bracket adjusts the antenna's orientation relative to the hatch body; and A retractable latching pin assembly positioned at a location along the periphery of the hatch body.

12. A multi-purpose hatch system of an aircraft having an aircraft opening, comprising:

A hatch body that seals the aircraft opening;

At least one aperture within the hatch body;

A pair of handles bolted to a bottom surface of the hatch body and on either side of the aperture;

At least one replaceable antenna mounting plug, block or plate, fitted and affixed within the at least one aperture to close the aperture;

at least one antenna bracket, the at least one antenna bracket configured to have an antenna mounted thereon and wherein the at least one antenna bracket is mounted on to the at least one replaceable antenna mounting plug, block or plate, the at least one antenna bracket being angled to adjust the antenna's orientation relative to the hatch body; and A concentric arrangement of a pressure seal, seal retaining ring and a weather seal, wherein the concentric arrangement is circumferentially arranged around the periphery of the hatch body, wherein the pressure seal rings the circumference of the hatch body, wherein the seal retaining ring is circumferentially positioned along the periphery of the pressure seal and wherein the weather seal is circumferentially positioned along an outer periphery of the hatch body.

* * * * *